UNITED STATES PATENT OFFICE.

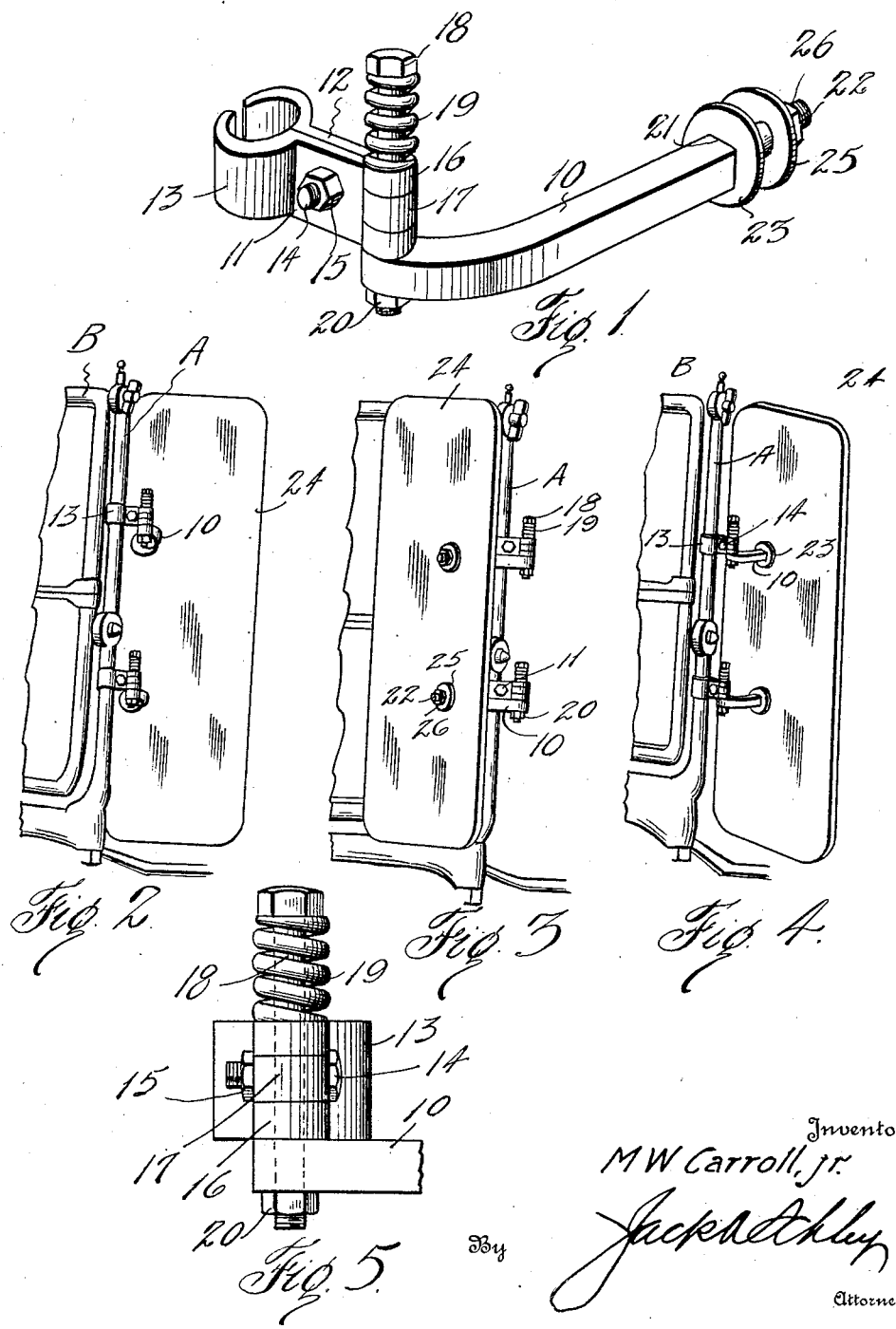

M. W. CARROLL, JR., OF DALLAS, TEXAS, ASSIGNOR TO AUTOMOTIVE SUPPLY MANUFACTURING COMPANY, OF DALLAS, TEXAS, A PARTNERSHIP COMPOSED OF LESTER L. HENDERSON, IRA V. WILSON, AND JOHN E. OWENS.

WIND-GUARD.

1,389,935.  Specification of Letters Patent.  Patented Sept. 6, 1921.

Application filed March 31, 1920. Serial No. 370,326.

*To all whom it may concern:*

Be it known that I, M. W. CARROLL, Jr., a citizen of the United States, residing at Dallas, in the county of Dallas and State of Texas, have invented certain new and useful Improvements in Wind-Guards, of which the following is a specification.

This invention relates to new and useful improvements in wind guards for wind shields of automobiles.

The idea involved is to provide a means of attaching the guard to the post of a wind shield in such a manner that the guard may be adjusted to any position without loosening nuts or bolts or any other fastening, but merely by moving the guards to the desired position at which it will remain until again moved. The advantage of such an arrangement is that the guard may be adjusted instantly by the driver and without stopping to unloosen fastenings or adjust any other part except the actual moving of the guard into the desired position.

In carrying out the invention a supporting connection is provided and arranged to be attached to the wind shield post and to carry the guard. The support will involve a friction joint so arranged as to sustain the movable portion of the support in a position to which it is adjusted. A practical construction includes a pair of clamps adapted to be fastened to the wind shield post. Each clamp has pivoted to its outer end an adjustable arm and these arms are suitably fastened to the guard. A friction joint, preferably under spring tension, is established between each clamp and its arms, whereby the arm will be held in the position to which it is swung. An advantage of such a construction is that the parts may be made more compact and the guard swung into closer relation to the wind shield as will be hereinafter more particularly pointed out.

The invention will be more readily understood from a reading of the following specification and by reference to the accompanying drawings, in which an example of the invention is shown, and wherein:

Figure 1 is a perspective view of one of the supporting brackets,

Fig. 2 is a partial front view of one side of the wind shield of an automobile showing the guard swung to its inward position to act as a protection against wind, Fig. 3 is a similar view showing the guard swung in front of the wind shield in position to permit the rain curtains of the automobile to be easily placed in position, Fig. 4 is a similar view showing the guard swung into position to act as a deflector to divert air current into the car, and Fig. 5 is a detail of one of the friction joints.

In the drawings the numeral 10 designates the arm of a supporting bracket which is pivoted to a clamp comprising corresponding members 11 and 12 respectively. Each clamp member has its inner ends curved and formed into a jaw 13, which jaws are opposed so as to engage around the usual post of the automobile wind shield. The members 11 and 12 have their intermediate portions or shanks connected by a transverse bolt 14 which receives a nut 15. The member 12 is provided at its outer end with a pair of spaced ears 16 while the member 11 has a single central ear 17 fitting between the ears 16.

An elongated bolt 18 passes through the ears and the inner end of the arm 10 which underlies the lowermost ear as is clearly shown in Figs. 1 and 5. The bolt 18 extends some distance above the upper ear 16 and receives a coil spring 19 which is confined between the head of the bolt and the upper ear of the clamp. A nut 20 is screwed on the lower end of the bolt and engages the under side of the arm 10, whereby the bolt is drawn downward and the spring placed under tension. The bolt 18 forms the pintle of the hinged joint between the clamp and the arm 10. The spring being placed under tension causes a frictional engagement between the arm 10 and the lowermost ear 16 and this frictional contact may be increased or decreased by adjusting the nut 20.

Each arm 10 has its outer end reduced so as to form a shoulder 21 and a screw-threaded shank 22. It is preferable to make the arm 10 larger than the shank so as to make the shoulder 21 somewhat pronounced. A washer 23 is slipped over the shank and bears against the shoulder 21. A glass plate 24 is employed as a guard and may be suitably shaped and formed. While it is preferable and desirable to make this plate of glass it may be constructed of other material. The plate is perforated so as to receive the shanks 22 which extend beyond the surface of said plate and receive a second washer 25 and a nut 26. The plate or guard is interposed between the washers 23 and 25 with which suitable packing means (not shown) may be used. By pressing up the nut 26 the plate is clamped between the washer and the washers 23 are held in contact with the shoulders 21. The guard is fastened on the arms at substantially right angles to the outer end portions thereof; however, it is pointed out that the inner ends of the arm are curved slightly inwardly whereby the greater length of each arm is off-set with relation to the clamps. In Figs. 2, 3 and 4 I have shown the clamps with their jaws 13 engaging on the post A of a wind shield B. It will be seen that whenever it is desired to exclude the air currents from the automobile at the sides of the wind shield the guard 24 is swung inward to the position shown in Fig. 2. By reason of the curved arms the guard may be brought into this position and caused to project at an angle of about forty-five degrese to the wind shield with its inner vertical edge either in contact or in juxtaposition to the inner face of the wind shield. It will be seen that unless the arm has the curvature the clamps would have to project at a greater distance in order that the guard might be swung inward as explained. When it is desired to deflect cool air into the automobile the guard may be swung outward to the position shown in Fig. 4 whereby a space is provided between the guard and the side of the wind shield and the guard disposed at such an angle as to deflect the air currents into the car. When it is necessary to put up the rain curtains (not shown) the guard may be readily swung in front of the wind shield as shown in Fig. 3.

The particular feature of the invention is the friction joint and it is obvious that the guard will remain in the position to which it is adjusted and that it may be adjusted readily and easily and merely by swinging it to the desired position. It is also pointed out that the shanks 22 may engage the guard 24 at one side of the center which permits both the clamps and the arms to be made shorter, however, this is not a limitation. It is pointed out that various changes could be made in the details of construction. It is also set forth that the construction of the bracket is simple and may be easily removed or applied to the wind shield post A by simply removing the nut 15. When the nut 15 is removed and the members 11 and 12 separated they cannot become disengaged from the bolt 18, therefore, the tension of the friction joint will not be disturbed. The bracket is neat in appearance and will be comparatively inexpensive to manufacture.

What I claim is:

In a wind guard, the combination with the post of a wind shield, of a horizontally swinging guard plate provided with transverse apertures spaced a substantial distance from the inner edge of the guard plate, arms extending through the apertures and clamped to the guard plate and disposed at a right angle to the guard plate, the inner end portions of the arms being longitudinally curved and extending inwardly, said arms being provided at their inner ends with transverse apertures and free from corrugations adjacent said apertures, upstanding bolts passing through the apertures of the arms, a pair of clamp members for each bolt, said clamp members being provided at their inned ends with a pair of jaws to engage the wind-shield post, means arranged near the jaws to draw the clamping members together, apertured knuckles carried by the outer ends of the clamp members and pivoted upon the bolt and serving to permanently secure the clamp members upon the bolt when the clamp members are opened, and a heavy coil spring surrounding the upper portion of the bolt and engaging the apertured knuckles.

In testimony whereof I affix my signature.

M. W. CARROLL, Jr.